United States Patent
Oliva et al.

(10) Patent No.: US 12,344,164 B2
(45) Date of Patent: *Jul. 1, 2025

(54) ROAD VEHICLE PROVIDED WITH AN AERODYNAMIC SOUND GENERATION SYSTEM

(71) Applicant: FERRARI S.P.A., Modena (IT)

(72) Inventors: Alfonso Oliva, Modena (IT); Luca Poggio, Modena (IT); Federico Acuto, Modena (IT); Matteo De Petris, Modena (IT)

(73) Assignee: FERRARI S.p.A., Modena (IT)

( * ) Notice: Subject to any disclaimer, the term of this patent is extended or adjusted under 35 U.S.C. 154(b) by 78 days.

This patent is subject to a terminal disclaimer.

(21) Appl. No.: 18/470,499

(22) Filed: Sep. 20, 2023

(65) Prior Publication Data

US 2024/0092261 A1    Mar. 21, 2024

(30) Foreign Application Priority Data

Sep. 21, 2022  (IT) .......................... 102022000019332

(51) Int. Cl.
*B60Q 5/00*    (2006.01)
(52) U.S. Cl.
CPC .................................. *B60Q 5/008* (2013.01)
(58) Field of Classification Search
None
See application file for complete search history.

(56) References Cited

U.S. PATENT DOCUMENTS

| | | | |
|---|---|---|---|
| 9,814,999 B2* | 11/2017 | Shaanti ................... | A63H 5/00 |
| 10,150,361 B2* | 12/2018 | Thurmeier ............ | B60K 11/06 |
| 11,260,792 B1* | 3/2022 | Lee ........................ | B60Q 5/008 |
| 11,733,960 B1* | 8/2023 | Karol ..................... | G08G 1/166 |
| | | | 340/463 |
| 12,090,835 B2* | 9/2024 | Merz ...................... | B60K 11/06 |
| 2009/0277707 A1* | 11/2009 | Ballard ................... | F04D 25/06 |
| | | | 340/384.3 |
| 2011/0199199 A1* | 8/2011 | Perkins .................. | B60Q 1/525 |
| | | | 340/435 |
| 2013/0036892 A1 | 2/2013 | Delporte | |
| 2016/0158661 A1* | 6/2016 | Shaanti ................... | A63H 5/00 |
| | | | 84/330 |

(Continued)

FOREIGN PATENT DOCUMENTS

WO   WO-2022056635 A1 *   3/2002   ............ G09B 15/04
WO   2009140289 A2   11/2009

OTHER PUBLICATIONS

Italian Search Report for Application No. 102022000019332, Filing Date: Sep. 21, 2022; Date of Mailing: April 117, 2023, 6 pages.

(Continued)

*Primary Examiner* — Fekadeselassie Girma
(74) *Attorney, Agent, or Firm* — CANTOR COLBURN LLP

(57) ABSTRACT

A road vehicle having: a bottom wall, which, in use, faces a road surface; a body, which delimits a passenger compartment; and an aerodynamic sound generation system, which is configured to generate sounds making use of the head wind, namely the movement of air relative to the road vehicle generated by the forward movement of the road vehicle.

20 Claims, 6 Drawing Sheets

(56) References Cited

U.S. PATENT DOCUMENTS

| | | | | |
|---|---|---|---|---|
| 2016/0205472 A1* | 7/2016 | Violi | ................... | G10K 15/02 |
| | | | | 381/86 |
| 2016/0311368 A1* | 10/2016 | Lee | ................... | G10K 15/04 |
| 2018/0056860 A1* | 3/2018 | Chang | ................... | B60Q 9/00 |
| 2018/0178691 A1* | 6/2018 | Takazaki | ................... | B60N 2/70 |
| 2018/0244212 A1 | 8/2018 | Negishi et al. | | |
| 2018/0272996 A1* | 9/2018 | Nielsen | ................... | B60S 1/52 |
| 2019/0009717 A1* | 1/2019 | Nagasawa | ................... | G10K 15/10 |
| 2020/0373859 A1* | 11/2020 | Lu | ................... | H02N 2/186 |
| 2021/0295817 A1* | 9/2021 | Gomez | ................... | B60Q 5/008 |
| 2021/0379998 A1* | 12/2021 | Lee | ................... | H04R 3/04 |
| 2021/0384873 A1* | 12/2021 | Yamamoto | ................... | B60K 35/60 |
| 2022/0118905 A1* | 4/2022 | Noh | ................... | H04R 1/2834 |
| 2022/0266747 A1* | 8/2022 | Kim | ................... | B60R 19/48 |
| 2023/0226974 A1* | 7/2023 | Rack | ................... | G10K 15/04 |
| | | | | 340/436 |
| 2023/0294662 A1* | 9/2023 | Kim | ................... | B60K 35/10 |
| | | | | 701/36 |
| 2024/0034230 A1* | 2/2024 | Haelvoet | ................... | H04R 1/2811 |
| 2024/0092261 A1* | 3/2024 | Oliva | ................... | G10B 3/08 |
| 2024/0198902 A1* | 6/2024 | Lee | ................... | G10K 15/02 |
| 2024/0355316 A1* | 10/2024 | Izzo | ................... | G10K 5/00 |

OTHER PUBLICATIONS

European Search Report for European Patent App. No. 23198572.2, Date of Mailing Jan. 16, 2024, 9 pages.

\* cited by examiner

ROAD VEHICLE PROVIDED WITH AN AERODYNAMIC SOUND GENERATION SYSTEM

CROSS-REFERENCE TO RELATED APPLICATIONS

This patent application claims priority from Italian patent application no. 102022000019332 filed on Sep. 21, 2022, the entire disclosure of which is incorporated herein by reference.

TECHNICAL FIELD

The present invention relates to a road vehicle.

The present invention can be advantageously applied to a high-performance sports car to which the present invention can be advantageously applied without any consequent loss of generality.

PRIOR ART

In a high-performance sports car, the sound that is perceived by the driver inside the passenger compartment is important. In fact, a non-negligible component in the judgement of a high-performance sports car is the "quality" of the sound that is emitted by the car in motion (not only and not so much in terms of sound intensity, but above all in terms of the "pleasantness" of said sound), i.e. the degree of satisfaction in the use of a high-performance sports car is also significantly influenced by the "quality" of the sound that is emitted by the car in motion and perceived by the driver located inside the passenger compartment.

In a traditional car provided with a combustion engine, a significant part (especially at speeds that are not very high) of the sound that is emitted by the car in motion is produced by the combustion engine and in particular by the exhaust of the combustion engine. In an exclusively electrically driven car, the sound that is emitted by the car in motion is essentially produced by aerodynamic swooshing and by the rolling of the tyres, as the sound generated by the electric motor(s) is almost inaudible and generally also little appreciated.

The patent application WO2009140289A2 describes an apparatus for simulating the sound of an internal combustion engine in an electric vehicle by means of a rotary air mover actuated by an electric motor.

DESCRIPTION OF THE INVENTION

The object of the present invention is to provide a road vehicle that in motion is capable of emitting a sound that can meet the expectations of the driver and potential passengers.

According to the present invention, a road vehicle is provided as claimed by the appended claims.

The claims describe preferred embodiments of the present invention and constitute an integral part of the present description.

BRIEF DESCRIPTION OF THE DRAWINGS

The present invention will now be described with reference to the accompanying drawings, which illustrate some non-limiting embodiments thereof, wherein.

PREFERRED EMBODIMENTS OF THE INVENTION

Figure 1:
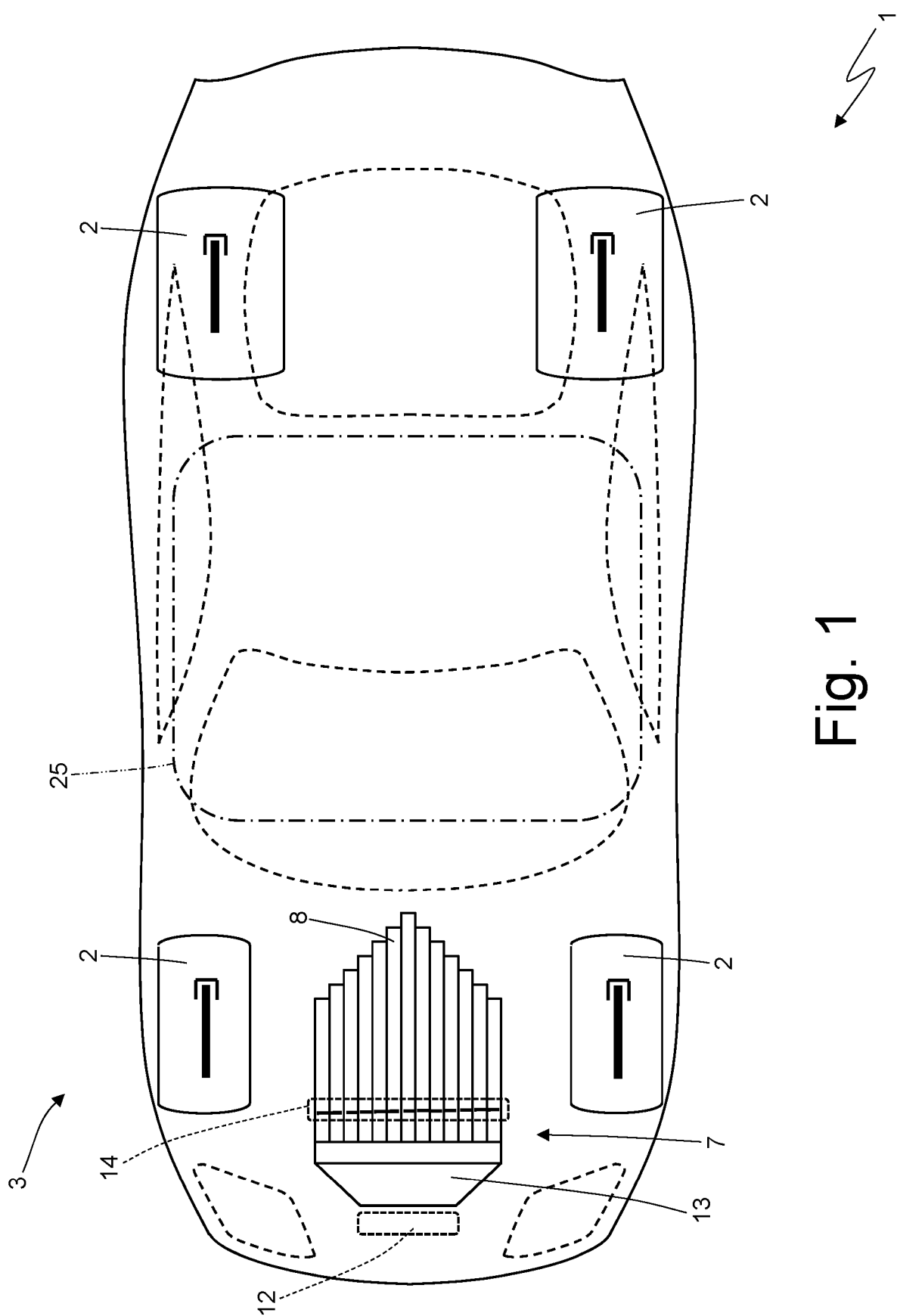
FIG. 1 is a schematic view of a car that is realized in accordance with the present invention and that is provided with an aerodynamic sound generation system.

In FIG. 1, the reference number 1 indicates, as a whole, a car (road vehicle) comprising a chassis, which supports (by means of corresponding suspensions) two front wheels 2 and two rear wheels 2.

According to a preferred embodiment, the rear wheels 2 and/or the front wheels 2 receive a drive torque from an electric powertrain system (namely provided solely with at least one electric motor); alternatively, the rear wheels 2 and/or the front wheels 2 receive a drive torque from a hybrid powertrain system (namely provided with both at least one electric motor and at least one combustion engine) or from a thermal powertrain system (namely provided solely with a combustion engine).

Figure 2:
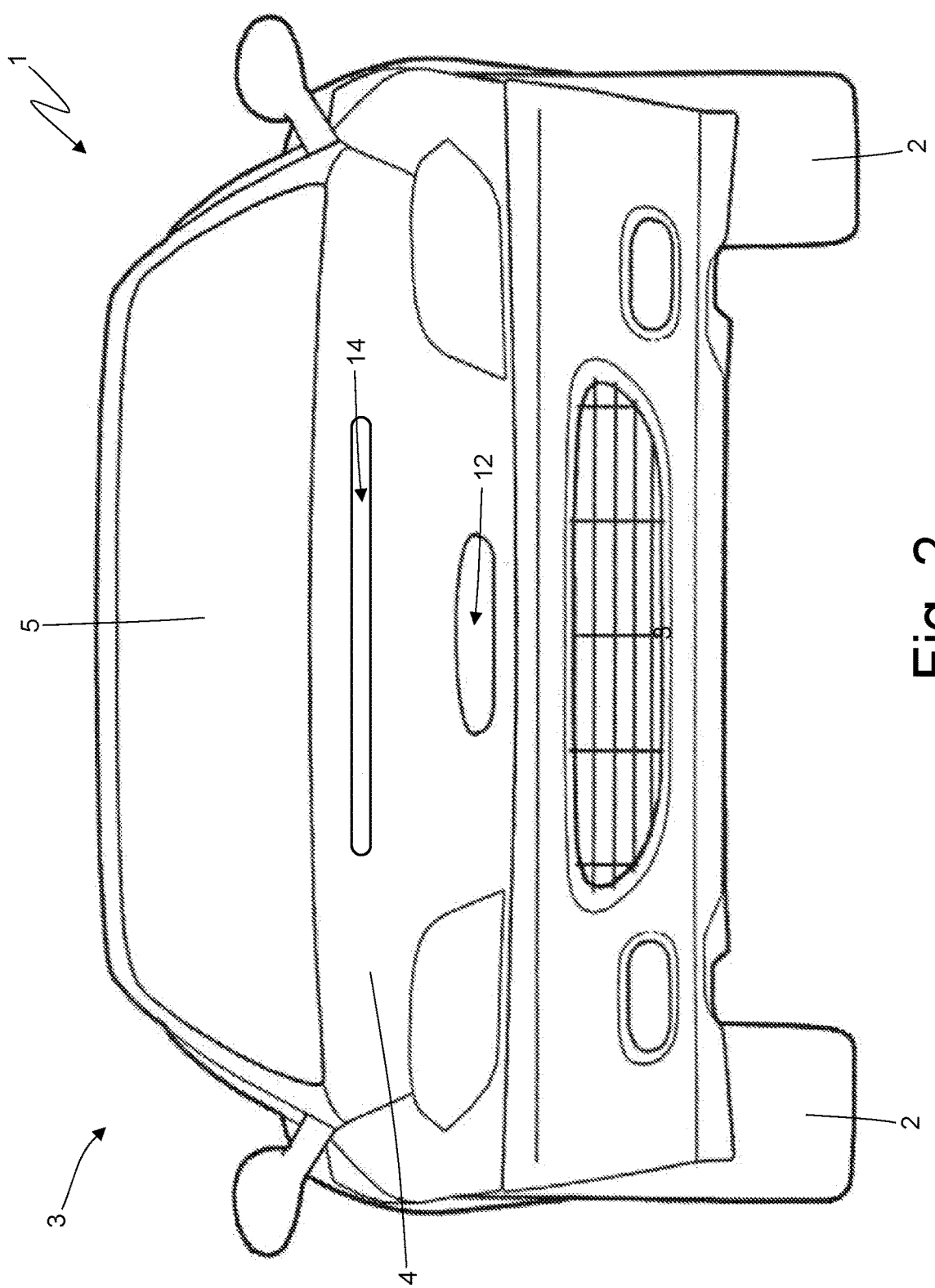
FIG. 2 is a front view of the car of FIG. 1.

As illustrated in FIG. 2, the chassis is covered by a body 3 which covers a passenger compartment which is arranged between the front wheels 2 and the rear wheels 2 and is provided with (at least) two seats each designed to accommodate a corresponding occupant; namely there is always room in the passenger compartment for a driver to whom (at least) a passenger can be added (whose presence is obviously optional). The body 3 comprises, among other things, a front bumper, a front hood 4, and a windshield 5 which delimits the passenger compartment at the front. Laterally, the body 4 has two sides that are provided with respective doors, each of which is equipped with a respective openable window.

The car 1 further comprises a bottom wall 6 (illustrated in FIG. 6), which, in use, faces a road surface and which is connected to the body 3 (i.e. the body 3 extends upwards from the bottom wall 6).

As illustrated in FIG. 1, the car 1 comprises an aerodynamic sound generation system 7 which is configured to generate sounds making use solely of the head wind, namely the movement of air relative to the car 1 generated by the forward movement of the car 1 (the head wind is zero when the car 1 is stationary and is more intense, the greater the forward speed of the car 1). In other words, the aerodynamic sound generation system 7 has no moving elements actuated by a (for example electric) motor in order to transmit a movement or a pressure to the air intended for the sound generation and thus uses only and solely the head wind for the generation of sound (i.e. it uses solely the movement and the pressure possessed by the head wind).

The aerodynamic sound generation system 7 comprises a plurality of aerophone instruments 8, which are arranged in parallel side by side and into which part of the head wind is conveyed; namely the head wind is used in the aerodynamic sound generation system 7 to activate (excite) the aerophone instruments 8, which causes said aerophone instruments 8 to generate sounds. Preferably, the aerophone instruments 8 are arranged side by side and are designed to generate sounds at differentiated frequencies in such a manner that the overall sound generated by the aerodynamic sound generation system 7 is a combination of sounds at different frequencies.

The aerophone instruments 8 are devices capable of generating a sound in which air is the primary medium that is set in vibration and thereby produces the sound. In particular, the aerophone instruments 8 are of a resonant type (resonant aerophones) inasmuch as the vibrating air is contained in a cavity of the aerophone instrument 8. In the embodiment illustrated in the accompanying figures, the aerophone instruments 8 are shaped like organ pipes, while according to other embodiments not illustrated the aerophone instruments 8 may have a different shape.

Figure 4:
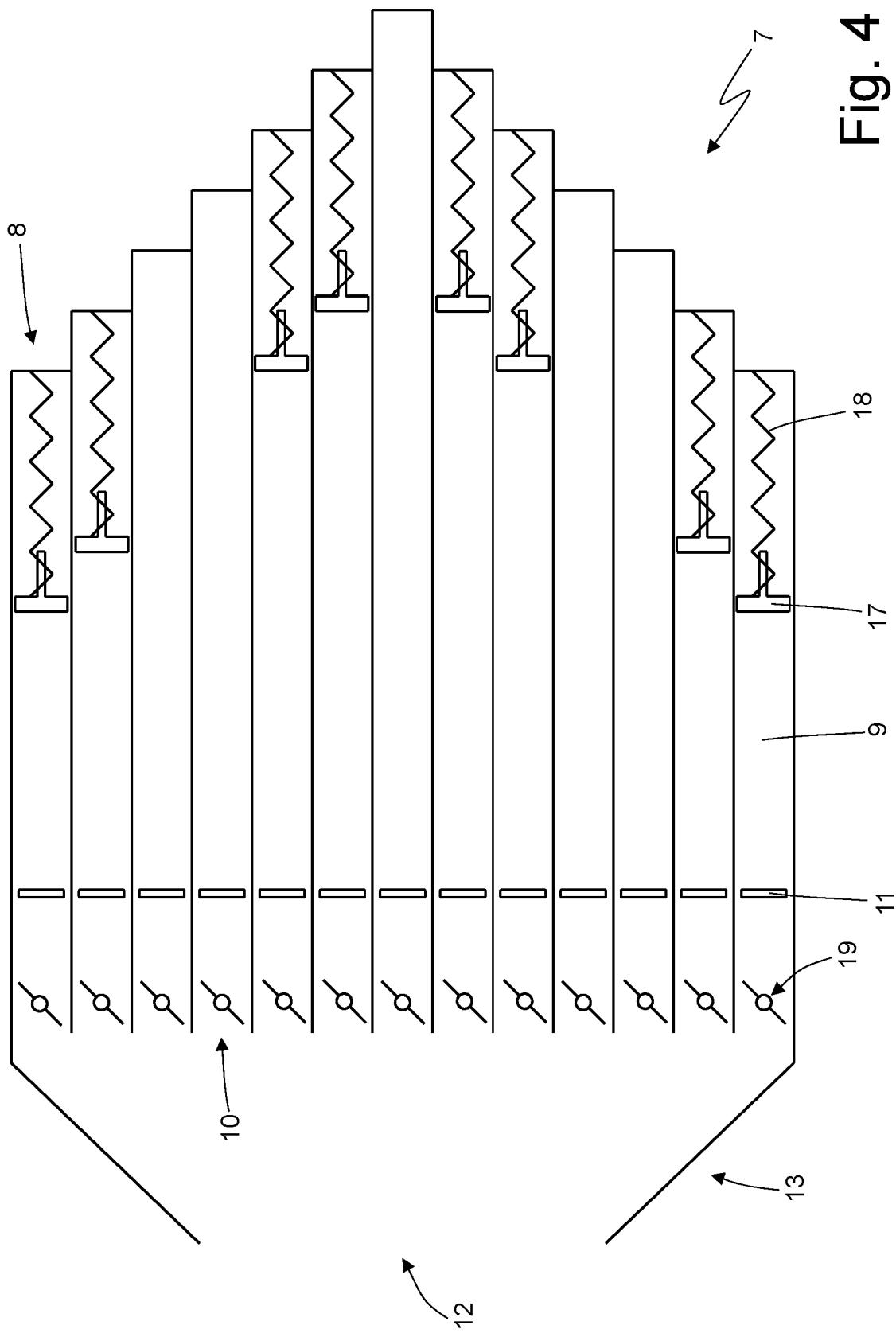
FIG. 4 is a schematic view of the aerodynamic sound generation system of the car of FIG. 1.

As illustrated in FIG. 4, each aerophone instrument 8 (i.e. each organ pipe) comprises a tubular body 9 of a circular cross-section, which has an inlet opening 10 at one end and is closed at the opposite end (i.e. is plugged by having a closing wall). The tubular body 9 has an outlet opening 11 laterally (also referred to as "mouth"). In use, the air is introduced into the tubular body 9 through the inlet opening 10 and exits the tubular body 9 through the outlet opening 11; in this passage, the particular internal shape of the tubular body 9 causes the air inside the tubular body 9 to vibrate, thereby generating a sound whose intensity depends on the diameter (width) of the tubular body 9 and on the flow rate of air passing through the tubular body 9 and whose frequency depends on the length of the tubular body 9.

The aerodynamic sound generation system 7 comprises the aerophone instruments 8 and a feeding device for conveying part of the head wind into each aerophone instrument 8. In particular, in each aerophone instrument 8 air is the primary medium that is set in vibration, thereby producing the sound, and each aerophone instrument 8 has a cavity intended to contain the vibrating air.

As illustrated in FIG. 1, the aerodynamic sound generation system 7 comprises an air intake 12, which is configured to intercept part of the head wind, and a feeding duct 13, which originates from the air intake 12 and leads to the inlet openings 10 of the aerophone instrument 8.

Figure 3:
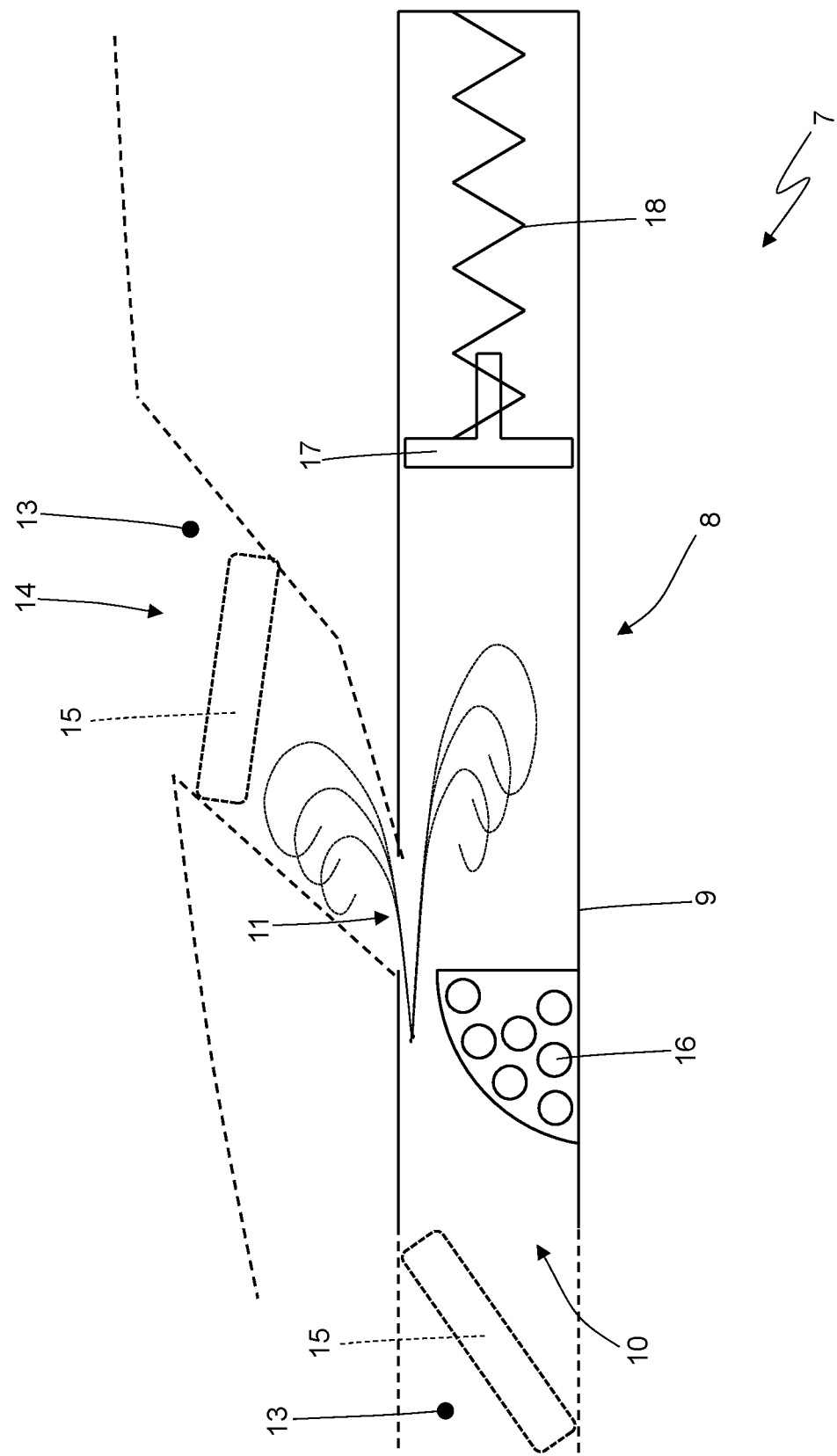
FIG. 3 is a schematic view of a single pipe of the aerodynamic sound generation system of the car of FIG. 1.

In the embodiment illustrated in FIGS. 1, 2 and 3, the air intake 12 is obtained through the body 3, namely it is essentially a "hole" in the body 3; in this embodiment, the feeding duct 13 continues downstream of the aerophone instruments 8 from the outlet openings 11 of the aerophone instruments 8 and ends in a release opening 14 through which the air having previously entered the feeding duct 13 through the air intake 12 exits said feeding duct 13. The release opening 14 is also obtained through the body 3, namely it is essentially a "hole" in the body 3 and is arranged (longitudinally) downstream of the air intake 12.

In other words, the feeding duct 13 extends from the air intake 12 obtained through the body 3 to the release opening 14 obtained through the body 3 downstream of the air intake 12 and is connected to the inlet openings 10 of the aerophone instruments 8 and to the outlet openings 11 of the aerophone instruments 8.

In the embodiment illustrated in FIGS. 1, 2 and 3, the aerodynamic sound generation system 7, and in particular the aerophone instruments 8 of the aerodynamic sound generation system 7, is arranged underneath the front hood 4; preferably (as best illustrated in FIG. 2), both the air intake 12 and the release opening 14 are obtained through the front hood 4.

According to a possible embodiment illustrated in FIG. 3, a radiator 15 is provided, namely an air-liquid heat exchanger, which is arranged along the feeding duct 13 upstream or downstream of the aerophone instrument 8. FIG. 3 shows both possible arrangements of the radiator 15, but obviously a single radiator 15 can be present along the feeding duct 13. Arranging the radiator 15 upstream of the aerophone instruments 8 prioritizes the cooling function over the sound-generating function, while arranging the radiator 15 downstream of the aerophone instruments 8 prioritizes the sound-generating function over the cooling function. According to a different embodiment not illustrated, the feeding duct 13 does not house a radiator 15.

According to a possible embodiment illustrated in FIG. 3, a radiator 16 is provided, namely an air-liquid heat exchanger, which is included in the aerophone instruments 8; namely the radiator 16 is inserted inside the tubular body 9 of each aerophone instrument 8 and is arranged between the inlet opening 10 and the outlet opening 11 in such a manner that it is hit by the air flow passing through the tubular body 9.

As illustrated in FIG. 3, each aerophone instrument 8 comprises an adjustment body 17, which is mounted in a movable manner in the aerophone instrument 8 so as to change the frequency of a sound generated by said aerophone instrument 8. In particular, the adjustment body 17 is a plunger axially moving inside the tubular body 9 of the aerophone instrument 8 so as to vary the length of the volume of vibrating air and thus vary the frequency of the sound generated by the vibration of the air (the greater the length of the volume of vibrating air is, the greater the wavelength of the sound and thus the lower the frequency of the sound generated by the vibration of the air). According to a preferred embodiment, each aerophone instrument 8 comprises an elastic element 18, which is configured to push the adjustment body 17 towards a forward position (closer to the outlet opening 11) and is configured to be compressed by the pneumatic thrust exerted by the air upon the adjustment body 17 so as to allow the adjustment body 17 to reach a rearward position. The useful length of each aerophone instrument 8 thus increases as the flow rate and the pressure of the air entering the aerophone instrument 8 increase, so that the frequency of the sound emitted by each aerophone instrument 8 decreases as the flow rate and the pressure of the air entering the aerophone instrument 8 increase.

According to a possible embodiment illustrated in FIGS. 3 and 4, only a part of the aerophone instruments 8 is provided with an adjustment body 17 (i.e. is capable of generating sounds at variable frequencies), and the remaining part of the aerophone instruments 8 is without an adjustment body 17 (i.e. always generates sounds at constant frequencies). According to one variant, the movement of the adjustment bodies 17 does not occur passively by exploiting the pneumatic thrust exerted by the air, but actively by means of an electronically controlled motorized actuator. According to a different embodiment that is not illustrated, all aerophone instruments 8 are without an adjustment body 17 and thus always generate sounds at constant frequencies.

As illustrated in FIG. 3, the aerodynamic sound generation system 7 comprises, for each aerophone instrument 8, an adjustment valve 19, preferably active and motorized, which is coupled to the inlet opening 10 of the aerophone instrument 8 and is configured to choke the inlet opening 10 of the aerophone instrument 8. By varying the degree of opening of the adjustment valve 19, it is possible to adjust the flow rate of air entering the corresponding aerophone instrument 8, so that it is possible to adjust the intensity of the sound generated by the aerophone instrument 8. Alternatively, only a part of the aerophone instruments 8 are provided with the adjustment valve 19, or none of the aerophone instruments 8 are provided with the adjustment valve 19.

In the embodiment illustrated in FIG. 4, a dedicated adjustment valve 19 is provided for each aerophone instrument 8. In the embodiment illustrated in FIG. 5, a single adjustment valve 19 (clearly larger and arranged near the air intake 12) common to all aerophone instruments 8 is provided.

Figure 5:
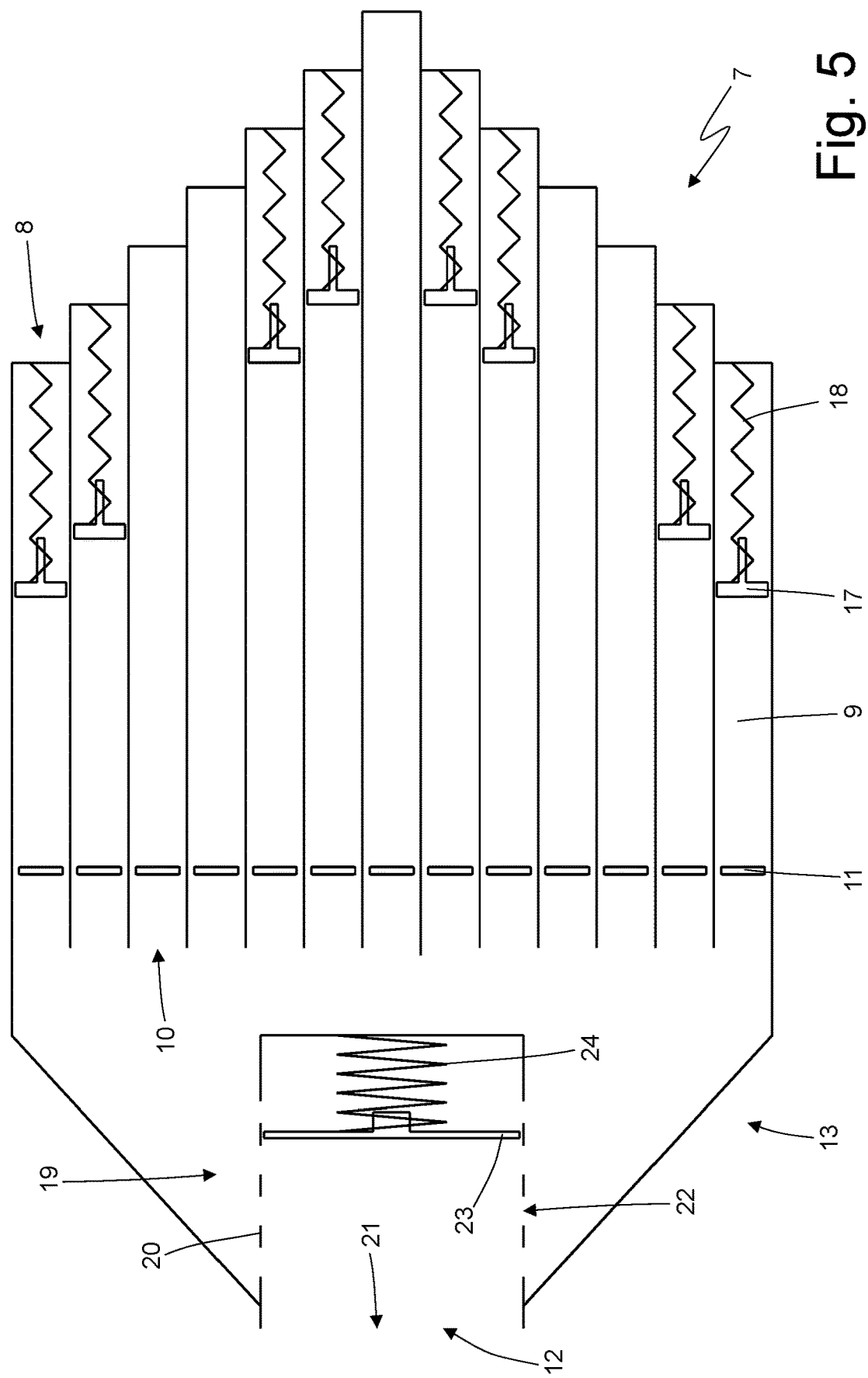
FIG. 5 is a schematic view of a variant of the aerodynamic sound generation system of the car of FIG. 1.

In the embodiment illustrated in FIG. 4, each adjustment valve 19 is preferably active and motorized; in the embodiment illustrated in FIG. 5, the single common adjustment valve 19 can either be active and motorized (according to a variant not illustrated) or it can be passive and thus without motorized actuators (according to FIG. 5).

As illustrated in FIG. 5, the adjustment valve 19 comprises a pipe 20 having an inlet opening 21, which is axially arranged and faces the air intake 12, and a plurality of outlet openings 22, which are radially arranged; in addition, the adjustment valve 19 comprises a plunger 23 mounted so as to move inside the pipe 20 (translate, slide) between a complete closing position, in which the plunger 23 is arranged between the inlet opening 10 and the outlet openings 22 (thereby preventing air from passing through the outlet openings 22, which are thus completely insulated from the air intake 12), and a complete opening position, in which the plunger 23 is not arranged between the inlet opening 10 and all the outlet openings 22 (thereby allowing air to pass through all the outlet openings 22, which are thus all connected by the air intake 12). Obviously, the plunger 15 can also assume intermediate positions that are located between the complete closing position and the complete opening position and that determine the isolation of only part of the outlet openings 22. The adjustment valve 19 finally comprises an elastic element 18 configured to push the plunger 23 towards the inlet opening 10 and towards the complete closing position and configured to be compressed by the pneumatic thrust exerted by the air upon the plunger 23 so as to allow the plunger 23 to reach a complete opening position.

The flow rate of air arriving at the inlet openings 10 of the aerophone instruments 8 thus increases as the flow rate and the pressure of the air arriving from the air intake 12 increase, so that the intensity of the sound emitted by the aerophone instruments 8 increases as the flow rate and the pressure of the air arriving from the air intake 12 increase.

Figure 6:
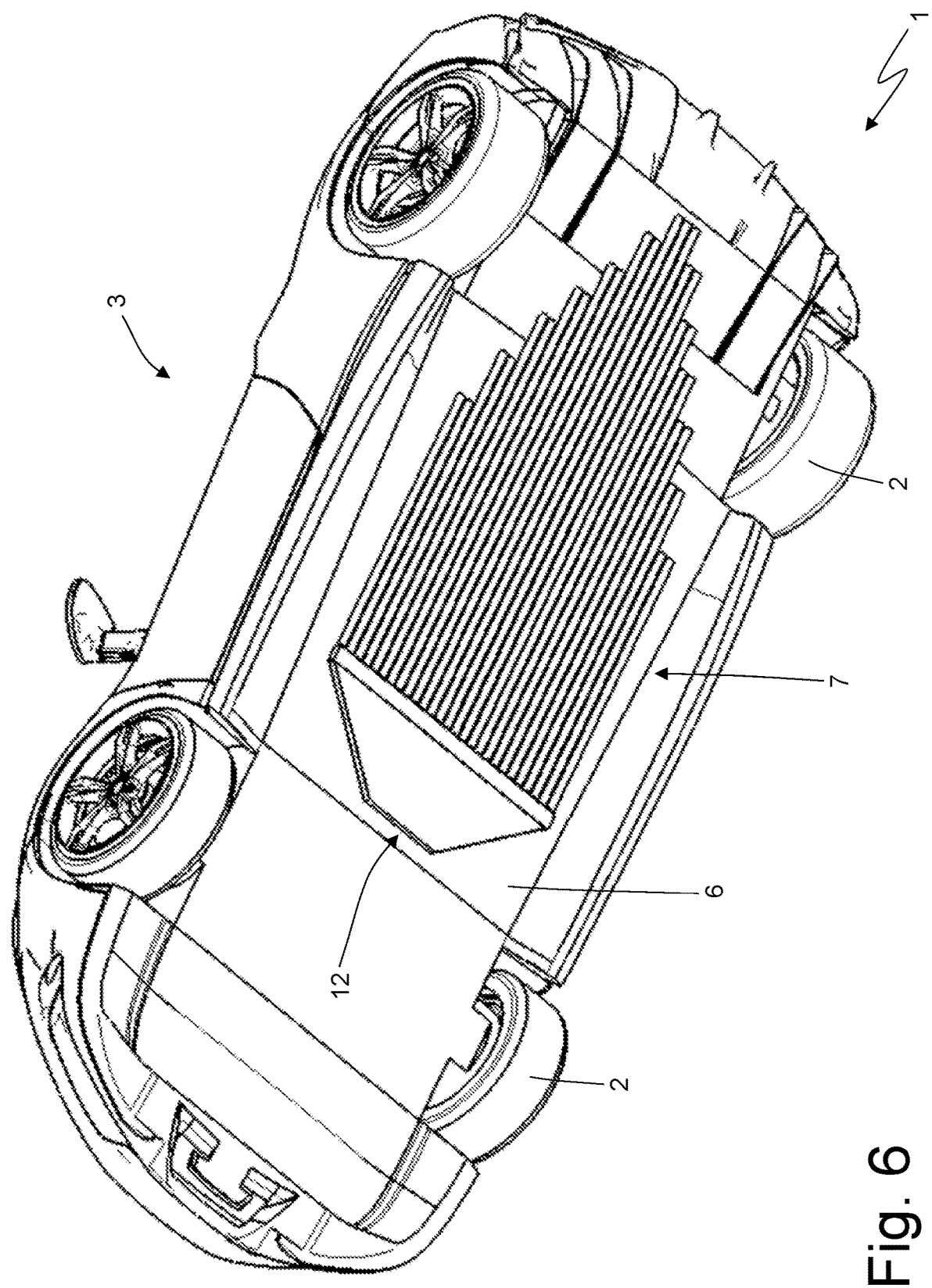
FIG. 6 is a schematic view of a different embodiment of a car that is realized in accordance with the present invention and that is provided with the aerodynamic sound generation system.

In the embodiment illustrated in FIGS. 1, 2 and 3, the air intake 12 is obtained through the body 3, so that the aerodynamic sound generation system 7 is arranged inside the body 3; in the embodiment illustrated in FIG. 6, on the other hand, the aerodynamic sound generation system 7 is fixed to the bottom wall 6 of the car 1, so that it protrudes in a cantilevered manner from said bottom wall 6. According to a further embodiment not illustrated, the air intake 12 is obtained through the bottom wall 6 of the car 1, so that the aerodynamic sound generation system 7 is arranged immediately behind the bottom wall 6, namely the aerodynamic sound generation system 7 is arranged between the bottom wall 6 and a floor of the car 1. In this embodiment, the feeding duct 13 generally ends at the inlet openings 10 of the aerophone instruments 8 and the inlet openings 11 of the aerophone instruments 8 lead directly into the outside environment.

According to a possible embodiment, the car 1 comprises a power storage system 25 (schematically illustrated in FIG. 1) which is part of the bottom wall 6 and supports the aerophone instrument 8; this embodiment can be combined with the presence of a radiator 16 included in one or more of the aerophone instruments 8 for cooling the storage system 25.

According to a possible embodiment, the aerodynamic sound generation system 7 could also comprise a compressor (actuated by a dedicated electric motor) that generates an additional air flow in addition to the flow of air entering from the air intake 12 when the car 1 advances at a moderate speed.

The embodiments described here can be combined with one another without departing from the scope of protection of the present invention.

The car 1 described above provided with the aerodynamic sound generation system 7 exhibits numerous advantages.

First of all, the car 1 described above makes it possible to generate a sound when driven that is "pleasant" (i.e. corresponds to the expectations of a driver of a high-performance sports car), is completely natural (i.e. originates completely from physical phenomena that occur due to the motion of the car and is not the result of a digital sound reproduced by loudspeakers), and varies autonomously as the forward speed of the car 1 varies. In particular, the sound generated by the movement of the car 1 can vary as the forward speed of the car 1 varies, both in intensity (which increases as the forward speed of the car 1 increases) and pitch (generally the overall pitch of the sound is higher at reduced speeds and lower at high speeds).

Moreover, variations in the sound generated by the movement of the car 1 as the forward speed of the car 1 varies can be achieved solely with passive actuators (which use the elastic elements 18 and 24), which are thus lighter, more compact, do not require a power supply, and are much less prone to malfunctioning.

Finally, the car 1 described in the foregoing is simple and inexpensive to realize, as the aerodynamic sound generation system 7 is not too bulky and can be accommodated in spaces that are normally free and unused (in a high-performance sports car). The realization of the aerodynamic sound generation system 7 is also simple and inexpensive on the whole, inasmuch as it essentially consists of metal pipes with walls of a small thickness (having no structural function and only having to withstand the thrust of the head wind).

LIST OF REFERENCE NUMBERS IN THE FIGURES 1 car
2 wheels
3 body
4 front hood
5 windshield
6 bottom wall
7 aerodynamic sound generation system
8 aerophone instrument
9 tubular body
10 inlet opening
11 outlet opening
12 air intake
13 feeding duct
14 release opening
15 radiator
16 radiator
17 adjustment body
18 elastic element
19 adjustment valve
20 pipe
21 inlet opening
22 outlet opening
23 plunger 24 elastic element
25 power storage system

The invention claimed is:

1. A road vehicle (1) comprising:
a bottom wall (6) which, in use, faces a road surface;
a body (3) which delimits a passenger compartment; and
an aerodynamic sound generation system (7);
wherein the aerodynamic sound generation system (7) is configured to generate sounds making use solely of the action of the head wind, namely the movement of air relative to the road vehicle (1) generated by the forward movement of the road vehicle (1); and
wherein the aerodynamic sound generation system (7) comprises at least one aerophone instrument (8) and a feeding device for conveying part of the head wind into the aerophone instrument (8);
wherein the feeding device of the aerodynamic sound generation system (7) comprises an air intake (12), which is configured to intercept part of the head wind, and a feeding duct (13), which originates from the air intake (12) and leads to an inlet opening (10) of the aerophone instrument (8),
wherein the aerodynamic sound generation system (7) comprises an adjustment valve (19), which is coupled to the feeding duct (13) and is configured to choke the passage of air along the feeding duct (13),
wherein the adjustment valve (19) comprises: a pipe (20) having an inlet opening (21), which is axially arranged and faces the air intake (12), and a plurality of outlet openings (22), which are radially arranged; a plunger (23) mounted so as to move inside the pipe (20); and an elastic element (24) configured to push the plunger (23) towards the inlet opening (10) and towards a complete closing position, in which the plunger (23) is arranged between the inlet opening (10) and the outlet openings (22), and configured to be compressed by the pneumatic thrust exerted by the air upon the plunger (23) so as to allow the plunger (23) to reach a complete opening position, in which the plunger (23) is not arranged between the inlet opening (10) and the outlet openings (22).

2. The road vehicle (1) according to claim 1, wherein in the aerophone instrument (8) air is the primary medium that is set in vibration, thereby producing the sound, and the aerophone instrument (8) has a cavity intended to contain the vibrating air.

3. The road vehicle (1) according to claim 1, wherein the aerodynamic sound generation system (7) comprises an adjustment valve (19), which is coupled to the inlet opening (10) of the aerophone instrument (8) and is configured to choke the inlet opening (10) of the aerophone instrument (8).

4. The road vehicle (1) according to claim 1, wherein the air intake (12) is obtained through the body (3).

5. The road vehicle (1) according to claim 4, wherein the aerophone instrument (8) is arranged under a front hood (4).

6. The road vehicle (1) according to claim 1, wherein the feeding duct (13) extends from the air intake (12) obtained through the body (3) to a release opening (14) obtained through the body (3) downstream of the air intake (12) and is connected to the inlet opening (10) of the aerophone instrument (8) and to an outlet opening (11) of the aerophone instrument (8).

7. The road vehicle (1) according to claim 6 and comprising a radiator (15), namely an air-liquid heat exchanger, which is arranged along the feeding duct (13) upstream or downstream of the aerophone instrument (8).

8. The road vehicle (1) according to claim 6 and comprising a radiator (16), namely an air-liquid heat exchanger, which is included in the aerophone instrument (8).

9. The road vehicle (1) according to claim 1, wherein the air intake (12) is obtained through the bottom wall (6).

10. The road vehicle (1) according to claim 1, wherein the aerophone instrument (8) is fixed to the bottom wall (6).

11. The road vehicle (1) according to claim 9 and comprising a power storage system (25), which is part of the bottom wall (6) and supports the aerophone instrument (8).

12. The road vehicle (1) according to claim 1, wherein the aerophone instrument (8) comprises an adjustment body (17), which is mounted in a movable manner in the aerophone instrument (8) so as to change the frequency of a sound generated by the aerophone instrument (8).

13. The road vehicle (1) according to claim 12, wherein the aerophone instrument (8) comprises an elastic element (18), which is configured to push the adjustment body (17) towards a first position and is configured to be compressed by the pneumatic thrust exerted by the air upon the adjustment body (17) so as to allow the adjustment body (17) to reach a second position.

14. The road vehicle (1) according to claim 13, wherein the adjustment body (17) is a plunger axially moving inside the aerophone instrument (8).

15. The road vehicle (1) according to claim 1, wherein the aerophone instrument (8) is shaped like an organ pipe.

16. The road vehicle (1) according to claim 1, wherein the aerodynamic sound generation system (7) comprises a plurality of aerophone instruments (8), which are arranged side by side and are designed to generate sounds at different frequencies.

17. A road vehicle (1) comprising:
a bottom wall (6) which, in use, faces a road surface;
a body (3) which delimits a passenger compartment; and
an aerodynamic sound generation system (7);
wherein the aerodynamic sound generation system (7) is configured to generate sounds making use solely of the action of the head wind, namely the movement of air relative to the road vehicle (1) generated by the forward movement of the road vehicle (1);
wherein the aerodynamic sound generation system (7) comprises at least one aerophone instrument (8) and a feeding device for conveying part of the head wind into the aerophone instrument (8);
wherein the feeding device of the aerodynamic sound generation system (7) comprises an air intake (12), which is configured to intercept part of the head wind, and a feeding duct (13), which originates from the air intake (12) and leads to an inlet opening (10) of the aerophone instrument (8);
wherein the feeding duct (13) extends from the air intake (12) obtained through the body (3) to a release opening (14) obtained through the body (3) downstream of the air intake (12) and is connected to the inlet opening (10) of the aerophone instrument (8) and to an outlet opening (11) of the aerophone instrument (8); and
wherein it is provided a radiator (15), namely an air-liquid heat exchanger, which is arranged along the feeding duct (13) upstream or downstream of the aerophone instrument (8).

18. A road vehicle (1) comprising:
a bottom wall (6) which, in use, faces a road surface;
a body (3) which delimits a passenger compartment; and
an aerodynamic sound generation system (7);
wherein the aerodynamic sound generation system (7) is configured to generate sounds making use solely of the action of the head wind, namely the movement of air relative to the road vehicle (1) generated by the forward movement of the road vehicle (1);

wherein the aerodynamic sound generation system (7) comprises at least one aerophone instrument (8) and a feeding device for conveying part of the head wind into the aerophone instrument (8);

wherein the feeding device of the aerodynamic sound generation system (7) comprises an air intake (12), which is configured to intercept part of the head wind, and a feeding duct (13), which originates from the air intake (12) and leads to an inlet opening (10) of the aerophone instrument (8);

wherein the feeding duct (13) extends from the air intake (12) obtained through the body (3) to a release opening (14) obtained through the body (3) downstream of the air intake (12) and is connected to the inlet opening (10) of the aerophone instrument (8) and to an outlet opening (11) of the aerophone instrument (8); and wherein it is provided a radiator (16), namely an air-liquid heat exchanger, which is included in the aerophone instrument (8).

19. A road vehicle (1) comprising:

a bottom wall (6) which, in use, faces a road surface;

a body (3) which delimits a passenger compartment; and an aerodynamic sound generation system (7);

wherein the aerodynamic sound generation system (7) is configured to generate sounds making use solely of the action of the head wind, namely the movement of air relative to the road vehicle (1) generated by the forward movement of the road vehicle (1);

wherein the aerodynamic sound generation system (7) comprises at least one aerophone instrument (8) and a feeding device for conveying part of the head wind into the aerophone instrument (8);

wherein the aerophone instrument (8) comprises an adjustment body (17), which is mounted in a movable manner in the aerophone instrument (8) so as to change the frequency of a sound generated by the aerophone instrument (8); and wherein the aerophone instrument (8) comprises an elastic element (18), which is configured to push the adjustment body (17) towards a first position and is configured to be compressed by the pneumatic thrust exerted by the air upon the adjustment body (17) so as to allow the adjustment body (17) to reach a second position.

20. The road vehicle (1) according to claim 19, wherein a useful length of the aerophone instrument (8) increases as the flow rate and the pressure of the air entering the aerophone instrument (8) increase, so that the frequency of the sound emitted by the aerophone instrument (8) decreases as the flow rate and the pressure of the air entering the aerophone instrument (8) increase.

* * * * *